July 8, 1952 — I. S. EGGLESTON — 2,602,536
LIVE ROLLER CONVEYER
Filed March 28, 1949
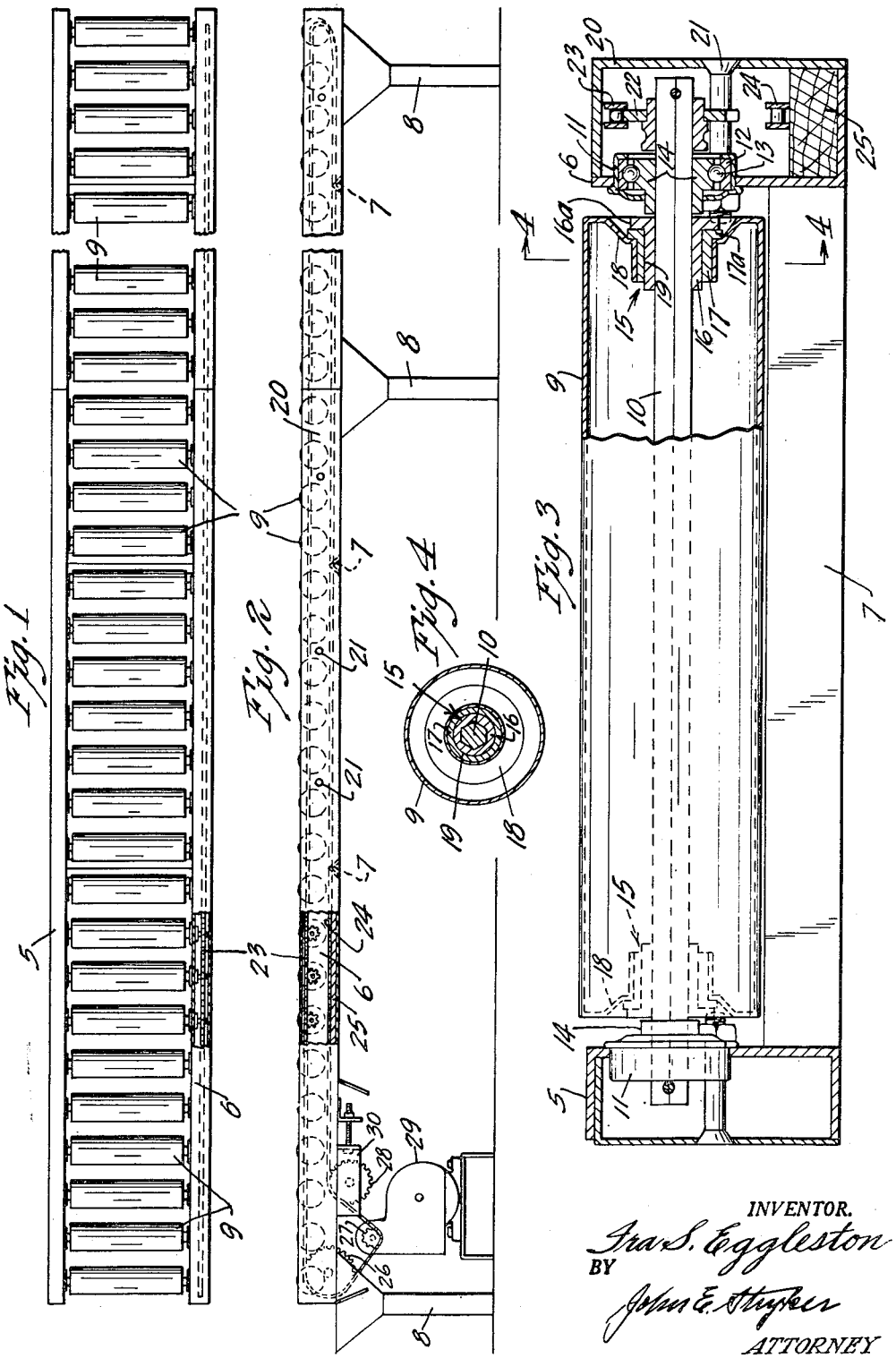
INVENTOR.
Ira S. Eggleston
BY John E. Stryker
ATTORNEY Patented July 8, 1952

2,602,536

UNITED STATES PATENT OFFICE 2,602,536

LIVE ROLLER CONVEYER

Ira S. Eggleston, St. Paul, Minn., assignor to Standard Conveyor Company, North St. Paul, Minn., a corporation of Minnesota Application March 28, 1949, Serial No. 83,985

4 Claims. (Cl. 198—127)

This invention relates to conveyors of the live roller type having a multiplicity of rollers adapted to carry load units on their upper peripheries and arranged to define a substantially horizontally extending path along which the load units may be moved by power applied to the several rollers and particularly to a conveyor of this type wherein the rotation of the several load supporting rollers may be interrupted, accelerated or retarded by relatively slight force applied either directly to the individual rollers or to the load units supported thereon.

It is an object of my invention to provide novel and efficient supporting and driving mechanism for the individual rollers of conveyors of the class described including continuously driven, axially disposed shafts for supporting the several rollers and friction type bearings interposed between the several rollers and their supporting shafts to permit independent rotation of the several rollers and interruption of the rotary movement thereof independently of their supporting shafts, the friction drive bearings being adapted to transmit torque to the several rollers which is proportional to or a function of the weight of the load carried thereby.

The invention also includes certain other novel features of construction which will be particularly pointed out and described in the following specification and claims.

My improved conveyor is particularly useful where the load units are to be either accumulated on the conveyor or retarded individually thereon or in any installation where their advance is to be arrested without stopping the entire conveyor. With ordinary live roller conveyors, when one or more load units are stopped, the rollers supporting such units continue to rotate in contact with the bottom surface of the load units and this often causes damage to the units as well as wear and unnecessary friction between the contacting surfaces and resulting excessive increase in the load transmitted to the driving mechanism and through it to the motor. Injury to workmen or operators of conventional live roller conveyors has also occurred when the hands or clothing of the operators have become caught between the positively driven rollers and the belt driving them. The present conveyor eliminates these disadvantages by permitting any roller or group of rollers to be retarded or stopped either when the load unit or units supported thereon are retarded or stopped thereon or when relatively slight retarding force is applied to any individual roller manually or otherwise. It also permits independent acceleration of the rollers and load units carried thereby.

Referring to the accompanying drawing which illustrates, by way of example and not for the purpose of limitation, a preferred embodiment of my invention;

Figure 1 is a top plan view of one of my improved conveyors with a portion of the casing of the driving mechanism broken away to show parts otherwise concealed;

Fig. 2 is a side elevational view of the same with a portion of the casing broken away;

Fig. 3 is a cross sectional view through the side rails and driving mechanism for one of the individual rollers, the roller being shown partially in elevation and partially in central longitudinal section, and Fig. 4 is a cross section taken on the line 4—4 of Fig. 3.

My improved conveyor has spaced parallel side rails indicated by the numerals 5 and 6 respectively and these rails are rigidly connected together at suitable intervals by cross frame members 7. The conveyor is supported on legs 8 so that the rails extend substantially horizontally. A multiplicity of load supporting rollers 9 are disposed crosswise between the rails 5 and 6 to define a substantially horizontally extending path along which the load units are to be moved.

Extending axially through each of the rollers 9 is a supporting shaft 10 which is preferably of non-circular shape in cross section, e. g. hexagonal. The end portions of each of the shafts 10 are supported in anti-friction bearings carried by the rails 5 and 6 respectively. These bearings are of the common ball type and have housings 11 which fit snugly in annular openings in the rails. Each housing contains an outer ball race 12 for a plurality of balls 13 and an inner race 14 which is broached to fit on and rotate with the shaft 10.

Friction bearings indicated generally by the numeral 15 (Figs. 3 and 4) support the ends respectively of each roller 9 on its axially disposed shaft 10. Each bearing 15 comprises an annular inner bearing member 16 which is broached to fit and rotate with the shaft 10 and an outer bearing member 17 which is revoluble on the cylindrical outer surface of the member 16. The outer bearing member 17 fits snugly in a hub member 18 formed on the end of the roller 9. An annular flange 17a is formed on the member 17 to abut against the outer end suface of the member 18 and an annular flange 16a is formed on the bearing member 16 to abut against the outer end surface of the flange 17a. When the shaft 10 is turned about its axis, torque is transmitted to the roller 9 by frictional engagement of the outer cylindrical surface 19 of the bearing member 16 with the inner cylindrical surface of the bearing member 17, these bearing members being duplicated at opposite ends of each roller 9. Since the load carried by each roller 9 is transmitted to its supporting shaft 10 through the cylindrical friction bearing surfaces, the torque transmitted by the shaft 10 to the roller carried thereby is proportional to the load carried by the roller.

Mechanism for positively rotating the shafts 10 in unison is mounted in a housing formed by the rail 6 and a removable cover 20 extending along this rail. The cover 20, which is angle shaped in cross section, is held in place by bolts 21 extending through perforations in the cover and rail 16 at suitable intervals. My preferred driving mechanism comprises sprocket wheels 22 severally fixed on the shafts 10 and a power-driven chain having an upper reach 23 engaging and extending substantially tangentially of the upper peripheries of the several spocket wheels 22 and a lower reach 24 which is slidably supported on a bar 25 extending along the rail 6. This drive chain is trained on suitable sprocket wheels including those indicated at 26, 27 and 28 shown in Fig. 2. The sprocket wheel 27 is arranged to be driven through gear connections with an electric motor 29 and the sprocket wheel 28 is adjustably mounted on a bracket 30 which is movable along the lower side of the rail 6 and arranged to be secured in various positions thereon for adjusting the tension in the drive chain.

In operation, the chain having the reaches 23 and 24 may be continuously actuated through connections with the motor 29 so that the several supporting shafts 10 of the rollers 9 are rotated in unison continuously. Rotation of the shafts 10 is transmitted to the several rollers through the cylindrical friction bearing members 16 and 17 to thereby move the load units carried on the upper peripheries of the rollers 9 along the conveyor at a suitable speed. The advance of the load units along the conveyor may be interrupted or retarded at any time by the application of relatively slight retarding force, by reason of my friction drive connections between the axial shafts and rollers. Thus rotation of any load supporting roller is stopped when the load unit in contact therewith is stopped, without interrupting the operation of the remaining portions of the conveyor. This has distinct advantages in a number of situations, e. g. where it is desired to accumulate a number of load units on the conveyor by stopping them manually or by mechanical means and then releasing any or all of them for further movement along a conveyor. It is also advantageous in some situations to permit a load unit or a group of them to be accelerated along the conveyor by force applied manually to the units, thus accelerating the rotation of the several rollers in engagement with the load units relative to the shafts supporting the rollers. Such accelerated movement of the load units is greatly facilitated by the use of the present invention which makes it unnecessary to slide the units in frictional engagement with the roller peripheries.

Danger of injury to the operators handling the load units is eliminated by permitting the several individual rollers to be stopped independently of the others by the application of slight retarding force.

Having described my invention, what I claim as new and desire to protect by Letters Patent is:

1. In a conveyor having a plurality of load supporting rollers disposed to carry loads on their upper peripheries, axially disposed shafts severally supporting said rollers, means for positively rotating said shafts in unison and radial load carrying friction bearings disposed between each of said rollers and its supporting shaft and constituting the sole means for transmitting torque from the shaft to the roller supported thereby said bearing permitting acceleration of the rotation and interruption of the rotation of each roller independently of its supporting shaft, said bearings being adapted to transmit torque to the several rollers which is proportional to the load carried by said bearings.

2. In a conveyor having a plurality of load supporting rollers defining a substantially horizontally extending load supporting surface, axially disposed shafts severally supporting said rollers, means for positively rotating said shafts in unison and radial load carrying bearings, each comprising inner and outer members which are fixed against relative movement longitudinally of their supporting shaft and having inter-engaging annular friction surfaces disposed between each of said rollers and its supporting shaft and constituting the sole means for transmitting torque from each shaft to the roller supported thereby and to permit rotation and interruption of the rotation of the several rollers independently of their supporting shafts, said bearings transmitting torque to the several rollers which is proportional to the load carried by said bearings.

3. In a conveyor having a plurality of load supporting rollers defining a substantially horizontally extending load supporting surface, an axially disposed shaft supporting each of said rollers, means for positively rotating said shafts in unison and a friction bearing having radial load carrying surfaces disposed between each of said rollers and its supporting shaft to transmit torque from the shaft to the roller carried thereby, said bearing members permitting rotation of the rollers to be interrupted independently of their supporting shafts and torque being transmitted from the several shafts to the several rollers solely through said load carrying surfaces and being proportional to the load on the respective bearings and coefficient of friction between said surfaces.

4. In a conveyor having a plurality of load supporting rollers disposed to carry loads on their upper peripheries, axially disposed shafts severally supporting said rollers, means for positively rotating said shafts in unison and friction bearings each having inner and outer members formed with elongated substantially cylindrical bearing surfaces revoluble one in contact with the other, severally disposed between each of said shafts and the roller carried thereby to transmit torque from each shaft to the roller carried thereby and to permit rotation of the shafts independently of the rollers supported thereon, said bearing members being operative to transmit torque from the supporting shaft to the roller which is proportional to the radial load on said bearing surfaces.

IRA S. EGGLESTON.

REFERENCES CITED

The following references are of record in the file of this patent:

UNITED STATES PATENTS

| Number | Name | Date |
|---|---|---|
| 1,097,303 | Costello | May 19, 1914 |
| 1,518,836 | Casel | Dec. 9, 1924 |
| 1,831,015 | Le Mare | Nov. 10, 1931 |
| 1,852,942 | Streine | Apr. 5, 1932 |